United States Patent [19]

Doll et al.

[11] Patent Number: 4,598,936

[45] Date of Patent: Jul. 8, 1986

[54] REMOTE CONTROLLED VACUUM JOINT CLOSURE MECHANISM

[75] Inventors: David W. Doll, San Diego; E. Randolph Hager, La Jolla, both of Calif.

[73] Assignee: The United States of America as represented by the United States Department of Energy, Washington, D.C.

[21] Appl. No.: 582,507

[22] Filed: Feb. 22, 1984

[51] Int. Cl.[4] .............................................. F16L 23/00
[52] U.S. Cl. ....................................... 285/18; 285/82; 285/88; 285/406; 285/320; 285/920
[58] Field of Search ....................... 285/18, 39, 82, 84, 285/87, 88, 89, 299, 406, 408, 424, 308, 313, 364, 317, 320, DIG. 21, DIG. 25; 403/338

[56] References Cited

U.S. PATENT DOCUMENTS

| | | | |
|---|---|---|---|
| 2,645,506 | 7/1953 | Sturgis | 285/39 |
| 3,517,949 | 6/1970 | Hirai et al. | 285/9 R |
| 3,692,337 | 9/1972 | Mischel | 285/299 |

FOREIGN PATENT DOCUMENTS

| | | | |
|---|---|---|---|
| 1289697 | 2/1969 | Fed. Rep. of Germany | 285/364 |
| 2729038 | 1/1979 | Fed. Rep. of Germany | 285/9 R |
| 669639 | 11/1929 | France | 285/82 |
| 854763 | 11/1960 | United Kingdom | 285/364 |

OTHER PUBLICATIONS

American & Nuclear Society 1982 Annual Meeting, Jun. 6–11, 1982, "Remotely Maintainable Fusion First Wall, Blanket and Shield".
American & Nuclear Society Meeting, Jun. 10, 1982, "Remotely Maintainable Connectors for Fusion Development".
Fifth Topical Meeting on the Technology of Fusion Energy, Knoxville, Tenn. Apr. 28, 1983, Doll and Hager, "Remote Vacuum Joint Concept for Fusion Reactors".

Primary Examiner—Cornelius J. Husar
Assistant Examiner—Eric K. Nicholson
Attorney, Agent, or Firm—Hugh W. Glenn; Robert J. Fisher; Judson R. Hightower

[57] ABSTRACT

A remotely operable and maintainable vacuum joint closure mechanism for a noncircular aperture is disclosed. The closure mechanism includes an extendible bellows coupled at one end to a noncircular duct and at its other end to a flange assembly having sealed grooves for establishing a high vacuum seal with the abutting surface of a facing flange which includes an aperture forming part of the system to be evacuated. A plurality of generally linear arrangements of pivotally coupled linkages and piston combinations are mounted around the outer surface of the duct and aligned along the length thereof. Each of the piston/linkage assemblies is adapted to engage the flange assembly by means of a respective piston and is further coupled to a remote controlled piston drive shaft to permit each of the linkages positioned on a respective flat outer surface of the duct to simultaneously and uniformly displace a corresponding piston and the flange assembly with which it is in contact along the length of the duct in extending the bellows to provide a high vacuum seal between the movable flange and the facing flange. A plurality of latch mechanisms are also pivotally mounted on the outside of the duct. A first end of each of the latch mechanisms is coupled to a remotely controlled latch control shaft for displacing the latch mechanism about its pivot point. In response to the pivoting displacement of the latch mechanism, a second end thereof is displaced so as to securely engage the facing flange.

20 Claims, 9 Drawing Figures

REMOTE CONTROLLED VACUUM JOINT CLOSURE MECHANISM

CONTRACTUAL ORIGIN OF THE INVENTION

The United States Government has rights in this invention under Contract No. W-31-109-38-6429 between Argonne National Laboratory and McDonnell Douglas Astronautics Company.

BACKGROUND OF THE INVENTION

This invention relates generally to vacuum seal mechanisms and is particularly directed to a remote controlled vacuum joint closure mechanism for a noncircular vacuum duct.

Joint systems have various applications such as in the areas of hydraulic couplers, electrical connectors and vacuum connections. These joint systems generally provide isolation for a given component, material or property (vacuum) of the system as it extends between first and second locations, or structures, of the system. A mechanical joint, or coupling, typically has various components including seals, a support structure, a clamping arrangement, alignment devices, load isolation, a handling system for maintenance and replacement, and a leak test provision for a vacuum or coolant joint.

The configuration of joint systems varies with the applications and environments in which they are used. Special characteristics and properties require specialized configurations and components in the joint system. For example, remotely operable joint systems generally require the application of seal forces uniformly over the range of thermal cycles, structural loads and pressure variations for a specified operating lifetime as well as provision for remote operation and replacement, or repair, of joint system components. The environment of a nuclear fusion reactor places perhaps the most demanding requirements on a remotely controlled vacuum joint system.

The prior art discloses various types and configurations of vacuum couplings. One example of a vacuum connector is a conoseal joint comprised of a male and female flange and a frustoconical shaped gasket(s) which is maintained in position either by bolts, v-band couplings, or a threaded union. These joints are generally limited to a circular cross-sectional shape and only the "double seal" conoseal joint is specifically designed for remote handling. Fusable metal seals are sometimes used for remote vacuum applications. These connectors include a low melting point alloy which provides both a seal and clamping in this type of joint which includes heaters embedded in the alloy to uncouple the joint. This type of seal is generally limited to use in a horizontal position and the low melting point alloy may not be compatible with high vacuum system out-gassing requirements.

Another example of a vacuum connector is the Gamah metal seal coupling in which a metal seal is positioned between conical surfaces and which makes use of a single bolt actuator requiring a 90° piping turn at the joint for remote applications. The Graylock Remote connector utilizes a trunion and drive screw mechanism which tightens and loosens the three piece clamping system around conical flanges. Components of the clamping system are mounted in a slotted backing plate and a ribbed delta-shaped metal seal ring is clamped between the flanges. The Transuranium Processing Facility disconnect coupler (Tru), developed at Oak Ridge National Laboratory for small liquid lines, includes process tubes at each end thereof provided with a ferrule. A single axial bolt draws the top clamp against the bottom casting, capturing the two tube ferrules and providing the sealing force. The Hanford Connector is similar in operation to a wheel puller and includes three jaws or hooks which slip under the shoulder of a male connector and, by tightening the operating screw, the female block and male flange are brought together. A single bolt is also used to clamp the Unibolt Coupling wherein locking tapered shelves are caused to rotate against each other in a wedging action by the single clamp bolt which exerts an axial sealing pressure on a metal seal ring.

The aforementioned connectors suffer from various limitations which severely restrict their use in hostile environments. For example, several of these vacuum connectors utilize elastomeric seals which are unable to withstand high levels of nuclear radiation, high temperatures, or the very high vacuum sealing requirements of a nuclear fusion reactor. In addition, these joint systems are limited to use with vacuum ducts having generally circular cross sections.

The present invention is intended to overcome the aforementioned limitations of the prior art by providing a noncircular vacuum joint closure mechanism capable of precise remote control and able to withstand high levels of nuclear radiation, high temperatures and high magnetic and electric fields while maintaining a very high vacuum seal.

OBJECTS AND SUMMARY OF THE INVENTION

Accordingly, it is an object of the present invention to provide an improved means for closing and sealing a noncircular vacuum duct.

It is another object of the present invention to provide closure means for a vacuum joint which can be remotely controlled.

Yet another object of the present invention is to provide an improved high vacuum joint closure means capable of withstanding high temperatures, large radiation flux and intense magnetic fields.

The present invention contemplates a rectangular duct provided with an extendable bellows at one end thereof. Also coupled to the bellows is a rectangular flange having a pair of seals on a surface thereof for abutting a second fixed flange in forming a high vacuum seal. Each of the four sides of the duct is provided with a plurality of latch mechanisms and opposing compression pistons. A set of levers on a first drive shaft coupled to each of the latches on a respective side of the duct provides for the simultaneous remote operation of the latch mechanisms. Similarly, a second drive shaft is coupled to each of the compression pistons on a respective side of the duct by means of respective coupled linkages. Rotation of the second drive shaft causes piston displacement in either extending or retracting the bellows in either establishing or breaking the vacuum joint connection by remote control. This permits final seal compression without displacing the entire duct.

In a preferred embodiment, a 1 meter×0.4 meter rectangular duct has 32 latches and 28 pistons mounted to its outer perimeter, with those pistons which would be positioned at the corners eliminated to provide improved closure mechanism access. The pistons and opposing latches are centered over the pair of seals on the duct's flange to avoid bending moments in the duct. At the end of each piston drive shaft is a locking device for maintaining the rotational position of the drive shaft and for limiting its angular displacement to 180°. The vacuum joint closure mechanism of the present invention is particularly adapted for use in the high radiation, high temperature, and high vacuum environment of a nuclear fusion reactor.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjuction with the accompanying drawings, where like reference characters identify like elements throughout the various figures, in which:

DESCRIPTION OF THE PREFERRED EMBODIMENTS

Figure 1:
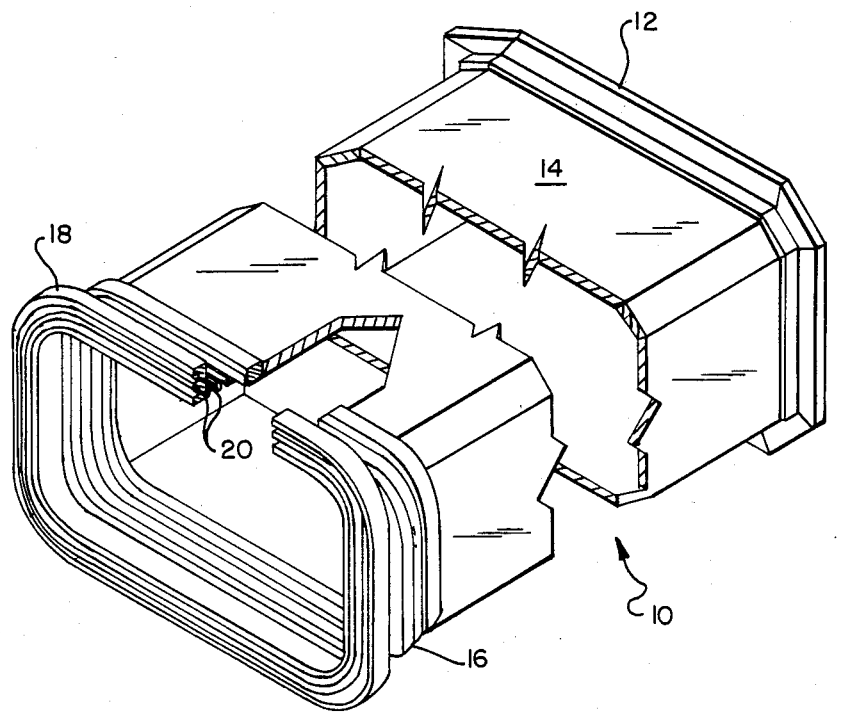
FIG. 1 is a partially cutaway perspective view of a vacuum duct for use in the remote controlled vacuum joint closure mechanism of the present invention.

Referring to FIG. 1, there is shown a partially cutaway perspective view of a vacuum duct 10 for use in the present invention. Vacuum duct 10 includes a conduit portion 14 having a generally rectangular cross section. The conduit portion 14 includes a flat flange 12 at one end thereof, while the other end thereof is coupled to a displaceable flange 18 by means of an extendible bellows 16. Thus, by coupling the conduit's flat flange 12 and the displaceable flange 18 to respective parts of a system to be evacuated, the vacuum duct 10 may be used to couple two areas of the evacuated system while maintaining a high vacuum therein. Bellows 16 includes a plurality of pleats which permit its extension and retraction and allow for the displacement of flange 18 toward and away from the flat flange end 12 of vacuum duct 10. It is in this manner that the length and the end-to-end alignment of the vacuum duct 10 may be adjusted as desired. Bellows 16 in a preferred embodiment of the present invention is comprised of stainless steel. The outer edge portion of the displaceable flange 18 includes a pair of seal grooves 20. A generally rectangular-shaped seal may be inserted in each of the seal grooves 20 for abutting and establishing a vacuum seal between displaceable flange 18 and a surface of the structure to which it is mounted in a manner described below.

Figure 2:
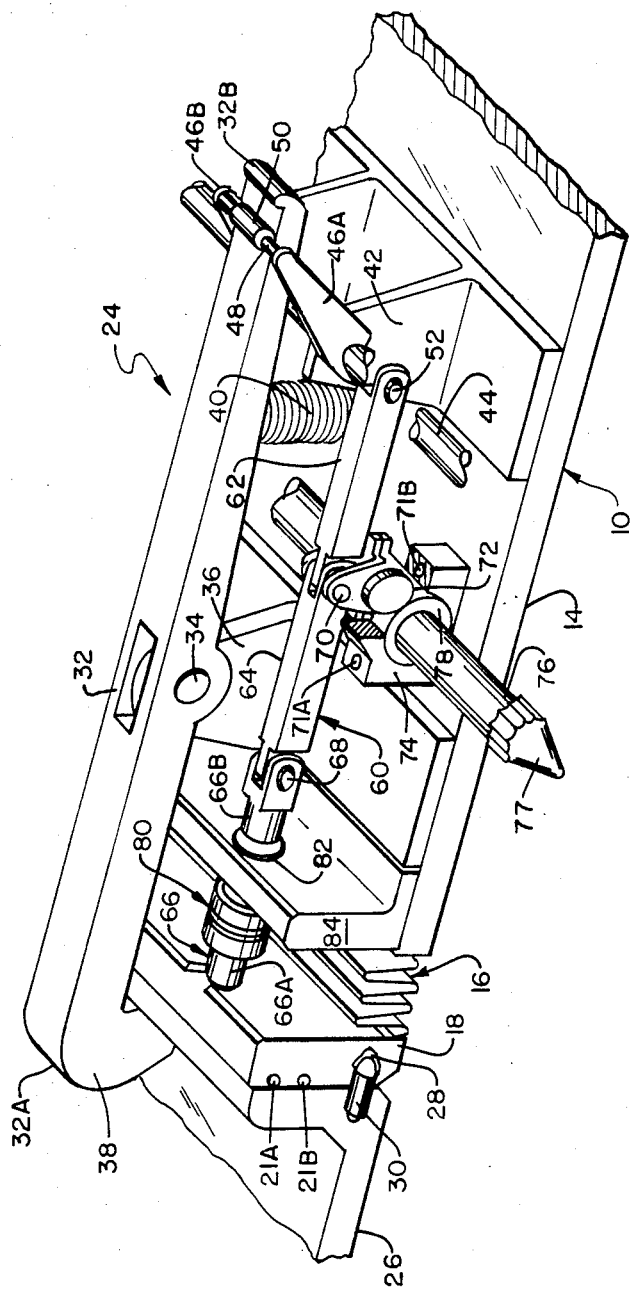
FIG. 2 is a perspective view of a remote controlled vacuum joint closure mechanism in accordance with the present invention.
Figure 3:
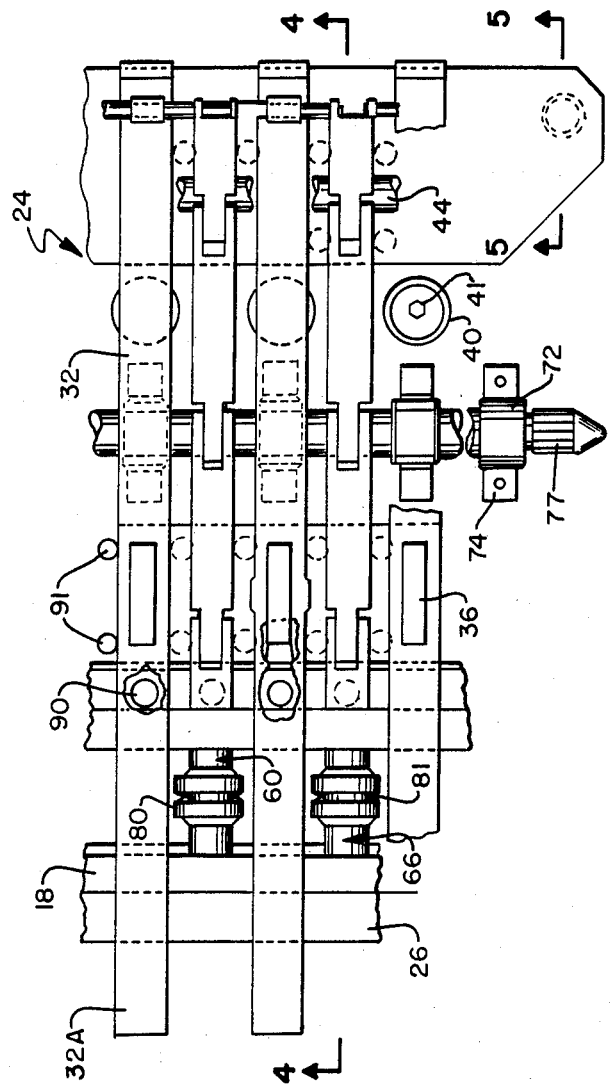
FIG. 3 is a top view of the remote controlled vacuum joint closure mechanism of FIG. 2.
Figure 4:
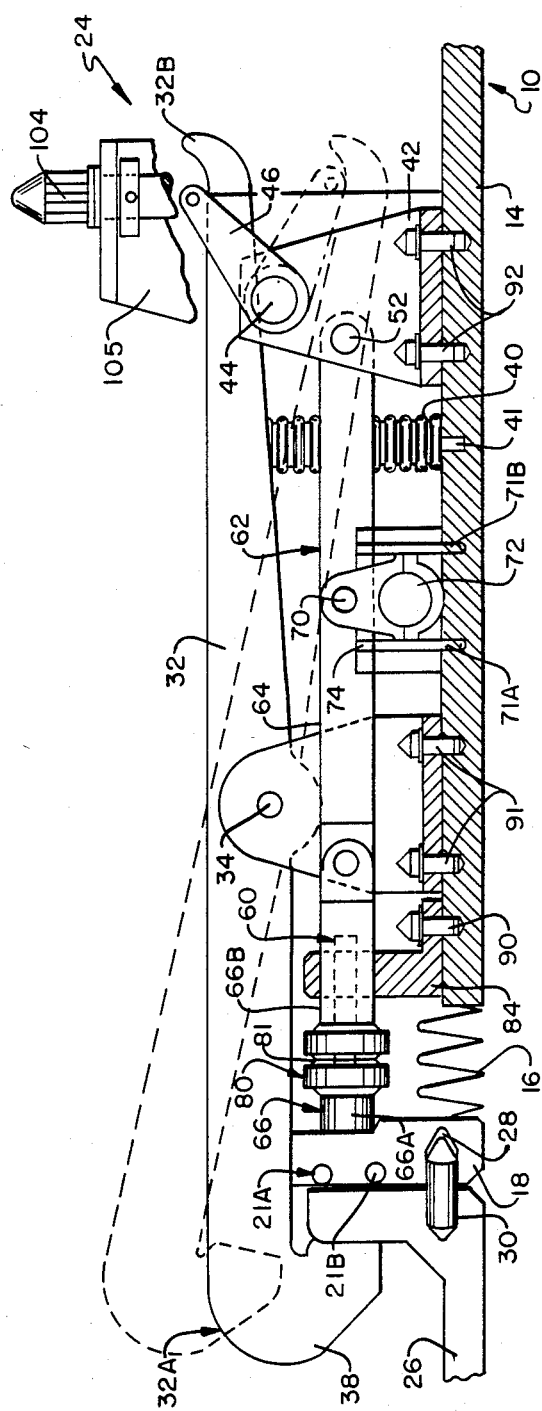
FIG. 4 is a sectional view taken along sight line 4—4 of the remote controlled vacuum joint closure mechanism shown in FIG. 3.

Referring to FIGS. 2, 3 and 4, there are respectively shown upper perspective, top and side views of a remote controlled vacuum joint closure mechanism 24 in accordance with a preferred embodiment of the present invention. A plurality of vacuum joint closure mechanisms 24 are mounted adjacent to one another on each side of the outer surface of the conduit portion 14 of a vacuum duct 10 as described below. While the vacuum joint closure mechanism 24 is shown and described as positioned at one end of vacuum duct 10, the present invention also contemplates the use of vacuum joint closure mechanisms at both ends of a vacuum duct 10. The following discussion describes the structure and mode of operation of each of the various vacuum joint closure mechanisms 24 mounted to the conduit portion 14 of the vacuum duct 10. The manner in which the plurality of vacuum joint closure mechanisms are arranged and positioned upon vacuum duct 10 is also described below.

The vacuum joint closure mechanism 24 is designed for establishing and maintaining a vacuum seal between a mating flange 26 and another portion of a vacuum system in vacuum sealed contact with the flat flange end 12 of vacuum duct 10.

Positioned upon an outer wall of the conduit portion 14 of a vacuum duct 10 is a latch mount 36. Pivotally coupled by means of a pivot pin 34 to the latch mount 36 is a latch arm 32. Latch arm 32 is free to pivot about pivot pin 34 in response to rotation of torque arm 44. Torque arm 44 is coupled by means of a pair of latch release arms 46A, 46B to the combination of a latch release pin 48 and latch release roller 50. Each of the latch release arms 46A, 46B is positioned on a respective side of the latch arm 32, with latch release roller 50 positioned in contact with an upper surface of the aft end 32B of latch arm 32.

With reference to FIG. 4, it can be seen that clockwise rotation of torque arm 44 will result in the application of a downward force upon the aft end 32B of latch arm 32 by latch release roller 50. The pivoting action of latch arm 32 causes an upward displacement of its forward end 32A, as shown in dotted line form in FIG. 4. It is in this manner that the hook element 38 on the forward end 32A of latch arm 32 is disengaged from the distal surface of mating flange 26 in unlocking the vacuum joint closure mechanism 24 of the present invention by remote control. From the figures, it can also be seen that the leading edge of the forward end 32A of latch arm 32 is chamfered to allow it to be raised when inserted by pushing against mating flange 26.

Positioned beneath and in contact with the lower surface of the aft end 32B of latch arm 32 is a positioning spring 40. Positioning spring 40 is maintained in place by means of an alignment pin 41 coupled to the conduit portion 14 of vacuum duct 10. The downward displacement of the aft end 32B of latch arm 32 results in the compression of positioning spring 40. Thus, positioning spring 40 biases latch arm 32 in the locked position regardless of its orientation upon the conduit portion 14 of vacuum duct 10, permitting it to be used even in an inverted position. Rotation of torque arm 44, which is pivotally mounted to vacuum duct 10 by means of a control shaft mount 42, will result in the downward displacement of the aft end 32B of latch arm 32 and the unlocking of the vacuum joint closure mechanism 24. Control shaft mount 42 and latch mount 36 are coupled to the conduit portion 14 of vacuum duct 10 by means of respective sets of mounting bolts 92 and 91.

Also mounted to the conduit portion 14 of vacuum duct 10 is a displacement mechanism 60 which serves to displace flange 18 along the axis of the vacuum duct 10 so as to abut and form a vacuum seal with mating flange 26. Displacement mechanism 60 is mounted to the conduit portion 14 of vacuum duct 10 by means of a cam mounting bracket 74 secured by mounting bolts 71A and 71B to an outer surface of vacuum duct 10. Mounting bracket 74 includes an aperture therein in which is inserted a connecting rod 78 which is free to rotate therein. A cam drive shaft 76 forms an extension of connecting rod 78 and the combination of cam drive shaft 76 and connecting rod 78 may be rotated by engaging screw head 77 with a conventional socket wrench. A locking mechanism for precluding the rotation of the combination of cam drive shaft 76 and connecting rod 78 is described below.

A cam 72 is coupled to connecting rod 78 and rotates therewith. Cam 72 is further coupled by means of connecting pin 70 to respective, adjacent end portions of a pivoting link 62 and a movable link 64. The other end of pivoting link 62 is pivotally coupled to control shaft mount 42 by means of pivot pin 52. The other end of movable link 64 is coupled by means of connecting pin 68 to a piston 66. Piston 66 is positioned within an aperture 82 in an alignment flange 84 which is securely coupled to the conduit portion 14 of vacuum duct 10 by means of mounting bolts 90. Piston 66 is freely displaceable along the length thereof within aperture 82.

Displacement mechanism 60 operates in the following manner. Rotation of cam drive shaft 76 results in a corresponding rotation of connecting rod 78 and cam 72. The rotation of cam 72 causes the vertical displacement of connecting pin 70 and the respective ends of pivoting and movable links 62, 64 coupled thereto. Pivoting and movable links 62, 64 are of equal length. With the other end of pivoting link 62 mounted in a pivoting manner to control shaft mount 42, the upward displacement of the coupled ends of pivoting and movable links 62, 64 will result in the displacement of connecting pin 68 and piston 66 coupled thereto in a rightward direction, or toward the rear of the vacuum joint closure mechanism 24, as viewed in FIGS. 2 through 4. With the forward portion of piston 66 loosely coupled to the aft surface of displaceable flange 18, rotation of cam drive shaft 76 resulting in the upward displacement of connecting pin 70 will also cause displaceable flange 18 to be displaced away from, and to no longer abut, mating flange 26. This will also result in the compression of bellows 16. Similarly, rotation of cam 72 in a clockwise direction as viewed in FIGS. 2 and 4 will result in a downward displacement in the coupled ends of pivoting and movable links 62 and 64 and the forward displacement of piston 66 causing displaceable flange 18 to move toward mating flange 26 in establishing sealed engagement therebetween. In this position bellows 16 is in the extended configuration. Thus, sealed engagement between mating flange 26 and displaceable flange 18 may be established or removed by the rotation of cam drive shaft 76 which may be accomplished by remote means via screw head 77 as described below.

Piston 66 includes a forward portion 66A and an aft portion 66B. The aft portion 66B is coupled by means of connecting pin 68 to the forward portion of movable link 64. The forward portion 66A of piston 66 bears against the rear surface of displaceable flange 18. The forward and aft portions 66A, 66B of the piston are coupled in a telescoping manner by means of a snubber assembly 80. The snubber assembly includes a belleville, or curved spring, washer 81 for urging the forward portion 66A of piston 66 against displaceable flange 18 in establishing a vacuum seal between displaceable flange 18 and mating flange 26. The spring constant of the belleville washer 81 is several thousand kilonewtons per millimeter which permits seal compression without a large piston stroke. This arrangement futher allows for final seal compression without displacing the entire vacuum duct. In addition, the compressive force exerted to set the vacuum seal is reacted through the latch arm 32 and the pivoting link 62 to a common base in the form of control shaft mount 42 and into the duct wall structure.

Outer and inner compression seals 21A, 21B are positioned within respective outer and inner compression seal grooves on the forward surface of displaceable flange 18 and abut mating flange 26 when the vacuum joint closure mechanism 24 of the present invention is in the sealed position. A guide pin 30 is positioned in the facing surface of mating flange 26 for insertion within a respective guide pin aperture 28 in the facing surface of displaceable flange 18 to insure proper alignment between the mating and displaceable flanges.

Figure 5:
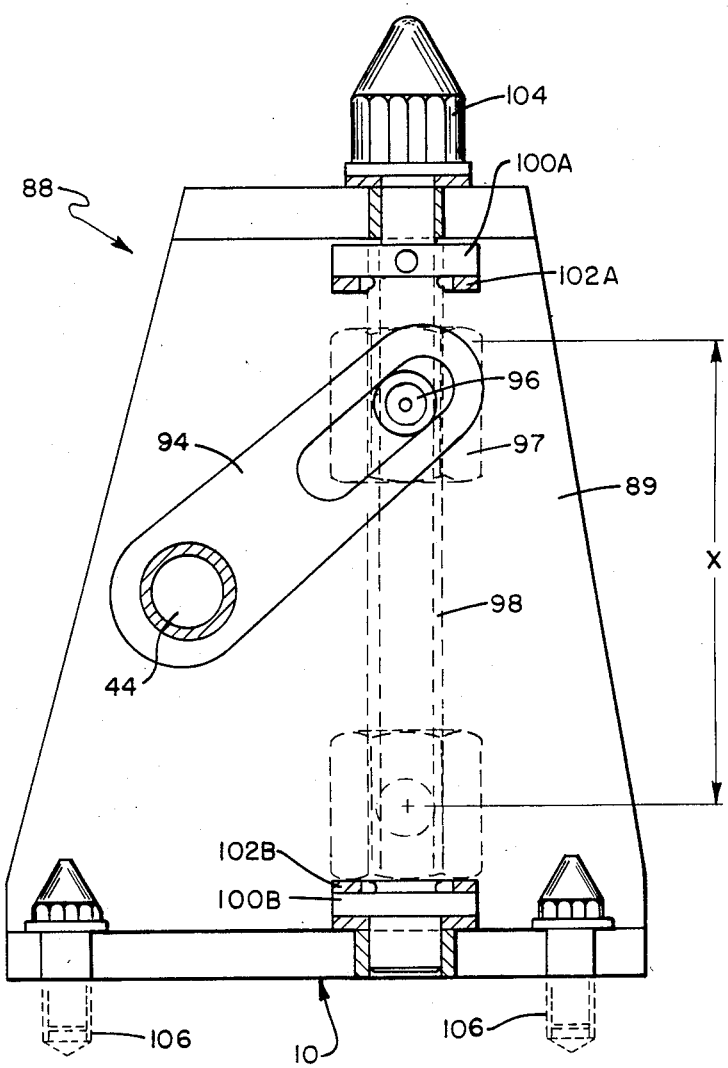
FIG. 5 is a side view showing a portion of the remote controlled vacuum joint closure mechanism of FIG. 3 taken along sight line 5—5 therein.

Referring to FIG. 5, there is shown a remote controlled latch release mechanism 88 for use in the present invention. Latch release mechanism 88 and a mounting assembly 89 are securely affixed to the conduit portion of the vacuum duct 10 by means of mounting pins 106. The latch release mechanism 88 is coupled to the torque arm 44 which controls the position of the latch arm 32 by means of a drive arm 94. Rotation of drive arm 94 causes a similar rotation of torque arm 44. Drive arm 94 is coupled to a rotating shaft 98 by means of a coupling pin 96. Rotational displacement of rotating shaft 98 results in either a clockwise or counter-clockwise rotation of the combination of drive arm 94 and torque arm 44. Positioned on respective upper and lower portions of rotating shaft 98 are upper and lower threaded spindles 100A, 100B in combination with upper and lower bumper stops 102A, 102B. Displacement of rotating shaft 98 by means of screw head 104 attached to one end thereof results in the vertical displacement of coupler 97 to which coupling pin 96 is attached. This, in turn, causes rotation of drive arm 94 about the longitudinal axis of torque arm 44 and the resulting rotation of torque arm 44. It is in this manner that latch arm 32 is pivotally displaced about pivot pin 34 in engaging and disengaging the remote controlled vacuum joint closure mechanism 24 of the present invention from the mating duct flange 26. Rotational displacement of latch arm 32 is limited by contact of coupler 97 with either upper or lower bumper stops 102A, 102B. As shown in FIG. 5, coupler 97 is vertically displaced along the axis of rotating shaft 98 over a distance "X". Latch release mechanism 88 may be coupled to the torque arm 44 virtually anywhere along its length permitting the latching and unlatching of the vacuum joint closure mechanism to be performed at a remote distance from the closure mechanism itself. Screw head 104 while compatible with a large variety of conventional wrenches is particularly adapted for use with a socket-type of wrench commonly used for remote handling.

Figure 6:
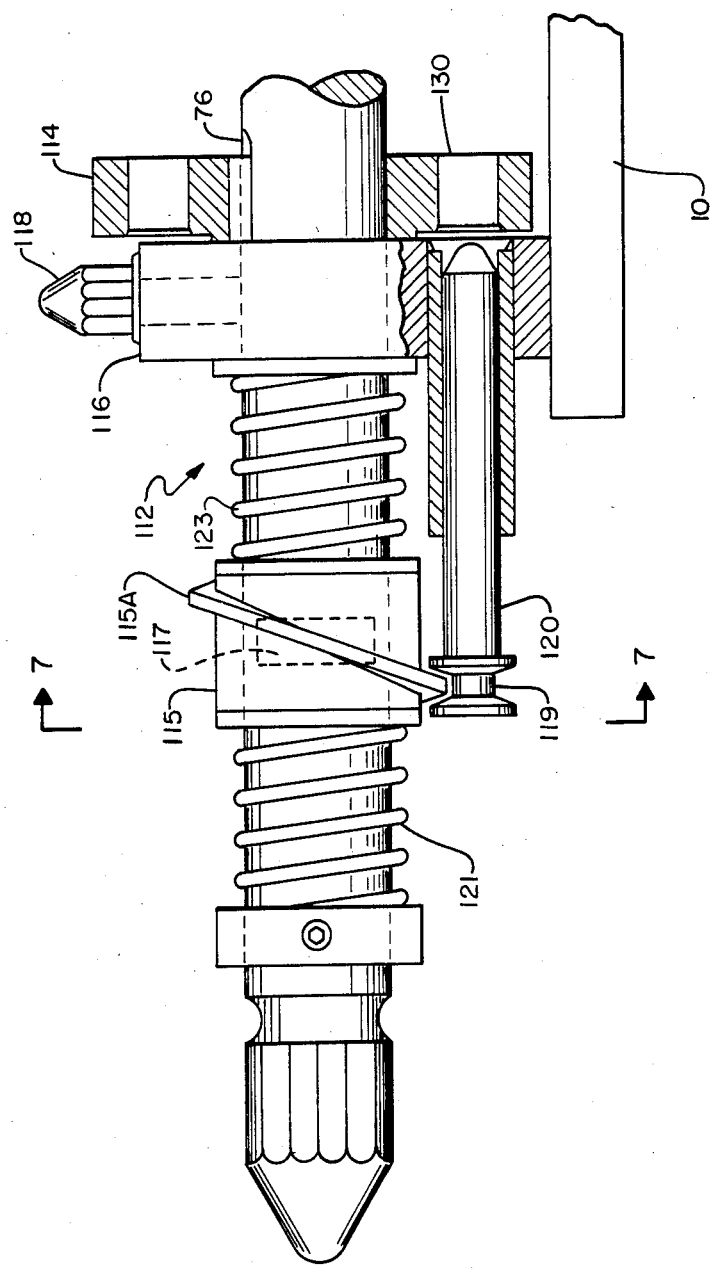
FIG. 6 shows a locking mechanism used for securing the remote controlled vacuum joint closure mechanism of FIG. 1 in a closed and sealed position.
Figure 7:
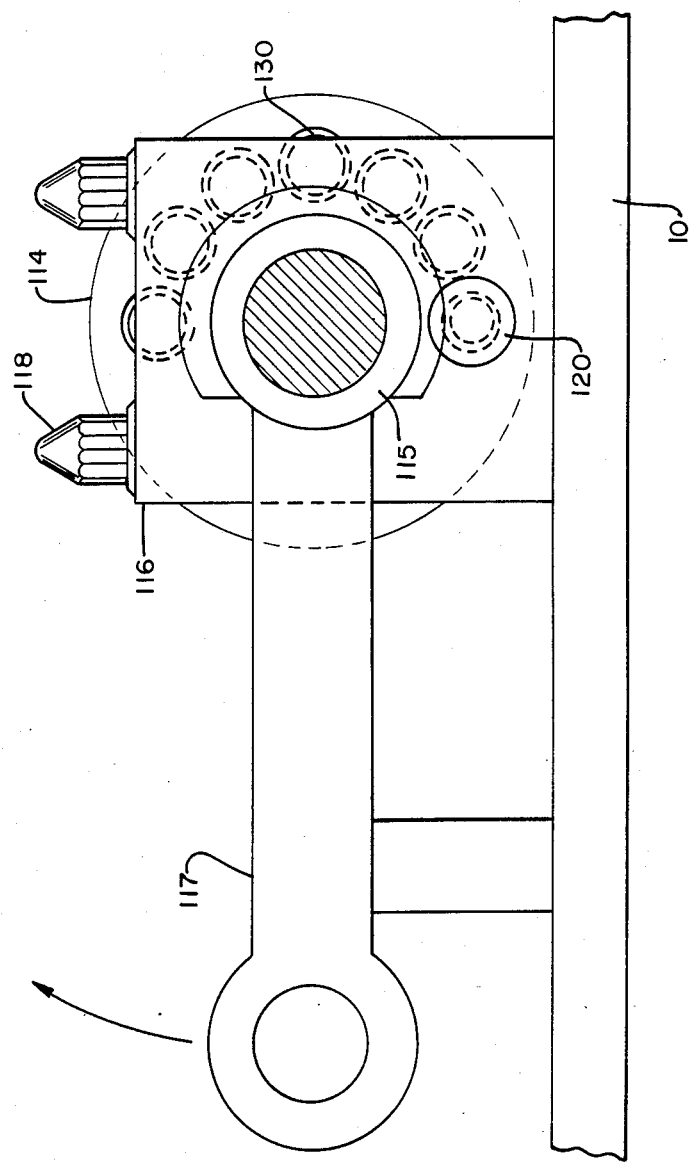
FIG. 7 is a sectional view of the locking mechanism shown in FIG. 6 taken along sight line 7—7 therein.

Referring to FIGS. 6 and 7, there are shown several views of a piston drive locking mechanism 112 for use in the present invention. The piston drive locking mechanism 112 is positioned along and coupled to the cam drive shaft 76. Since the piston drive locking mechanism 112 may be positioned anywhere along the length of the cam drive shaft 76, the vacuum joint closure mechanism 24 may be locked in a sealed arrangement by remote control. This is accomplished by means of piston drive locking mechanism 112.

Piston drive locking mechanism 112 includes a lock coupling 114 securely mounted on cam drive shaft 76 so as to rotate therewith. Cam drive shaft 76 is inserted through and supported by a locking mechanism mounting assembly 116 secured to the vacuum duct 10 by means of mounting bolts 118. Cam drive shaft 76 is free to rotate within locking mechanism mounting assembly 116. As shown in FIG. 7, lock coupling 114 is disc-shaped and includes a plurality of circular apertures 130 on one-half of the lock coupling. Positioned immediately below and parallel to the drive shaft 76 is a locking pin 120. Locking pin 120 is also positioned within and supported by mounting assembly 116 and clearly displaceable along its length within mounting assembly 116. Locking pin 120 is positioned immediately adjacent lock coupling 114 so as to be positioned in mounting assembly 116 and one of the aligned apertures 130 in the lock coupling 114. With locking pin 120 thus positioned within one of the locking apertures 130 of lock coupling 114, cam drive shaft 76 is not free to rotate and the vacuum joint closure mechanism 24 may be locked in a sealed configuration.

The displacement mechanism 60 may be unlocked for breaking the vacuum seal in the following manner. The locking pin 120 is inserted or withdrawn from aperture 130 with retractor 115. By moving the lock lever 117 180° clockwise or counterclockwise, the helical guide 115A wich is part of the retractor moves in a slot 119 in locking pin 120 forcing the retractor 115 to be displaced against either spring 121 or spring 123 on either side of the retractor. When the pin 120 is in the unlocked position, the lever 117 is in the extreme clockwise position as viewed in FIG. 7. The resisting torque of the shaft holds the pin 120 in this position until the torque tool or impact wrench removes the load from the locking pin 120.

When the shaft 76 is to be turned to another position, as will be the case during the step-by-step clamping procedure, the lever 117 is turned from the extreme clockwise position to the extreme counter-clockwise position. This moves the helical guide 115A engaged with pin 120 axially away from the mounting assembly 116. Since the pin 120 is held by friction in aperture 130, the retractor 115 does not move the pin 120 but rather moves axially toward the mounting assembly 116 compressing the return spring 123 nearest the mounting assembly 116. When the torque wrench turns the shaft 76 removing the retaining force on the pin 120, spring 121 is compressed and presses on the retractor 115 which, in turn, presses on the pin 120 withdrawing it from aperture 130 freeing the lock coupling and shaft 76 to rotate to a new position. As the new rotational position of the shaft 76 is approached, the lock lever 117 is moved from the extreme counterclockwise position to the extreme clockwise position as viewed in FIG. 7. This forces the helical guide 115A against the pin 120 moving the helical guide 115A axially toward the mounting assembly 116. With pin 120 not aligned with an aperture, it presses against the lock coupling between apertures 130 which causes the retractor 115 to move axially along the shaft 76 compressing the return spring 121 on the spline end of the shaft 76. As the shaft 76 is rotated further, the pin 120 finds the appropriate aperture 130 and under the force of the return spring 121 is inserted in the aperture 130, again locking the shaft 76 and preventing it from rotating in either direction. This procedure is repeated for each drive shaft a sufficient number of times to completely compress the two flanges 18 and 26 or release them from the reaction force of the metallic seals 21A and 21B.

Figure 8:
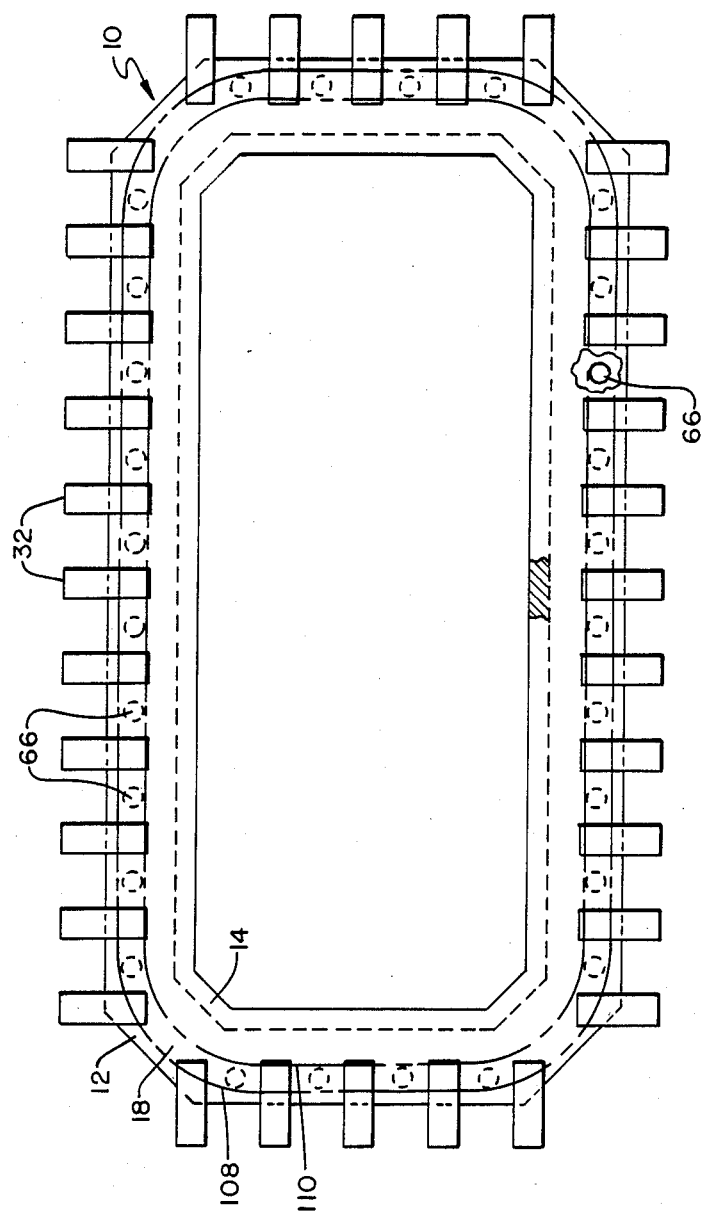
FIG. 8 is an end-on view of a vacuum duct provided with a plurality of combinations of locking and sealing mechanisms in accordance with the present invention.

Referring to FIG. 8, there is shown an end-on view of a vacuum duct 10 provided with a plurality of combinations of latch arms 32 and pistons 66. Each latch arm 32 has coupled thereto a vacuum joint closure mechanism as previously described and each piston 66 has coupled thereto a displacement mechanism as previously described. The various components associated with each of the aforementioned displacement and latch mechanisms are not shown in FIG. 8 for simplicity sake. The view of the vacuum duct 10 shown in FIG. 8 is from the displaceable flange 18 end thereof. The outer and inner compression seal center lines 108 and 110 are shown on a facing, outer surface of the displaceable flange 18. In a preferred embodiment, a 1.0 meter×0.4 meter rectangular duct is provided with 32 latch arms 32 and 28 pistons 66 around the perimeter of the vacuum duct 10. The upper and lower sides each have 11 latch arms and 10 pistons, while the sides have 5 latches and 4 pistons. Pistons which would otherwise be positioned at the corners of the vacuum duct 10 are not provided in order to permit the linkage drive shafts to extend away from the duct for facilitating access thereto. Flange stiffness compensates and distributes the load to the remaining pistons. The seals are positioned 0.032 meters apart and maintain an $\approx 0.1$ meter curvature through the corners of the displaceable flange 18. The pistons and the opposed latches are centered over the seal pair so that bending moments are not introduced into the vacuum duct.

In a preferred embodiment, each set of five pistons is attached to a common cam drive shaft which extends away from the vacuum duct 10 for engagement with a torque or impact wrench. This provides six straight cam drive shafts which extend away from the sides of the vacuum duct 10 as shown in FIG. 8. If shielding is provided, the cam drive shaft and screw head attached to the end thereof can either remain inside the shielding or extend through the shielding depending upon the environment in which the vacuum joint closure mechanism is employed. Similarly, a plurality of latch arms on a common side of the vacuum duct 10 are coupled to a common torque arm and responsive to the rotational displacement thereof.

Figure 9:
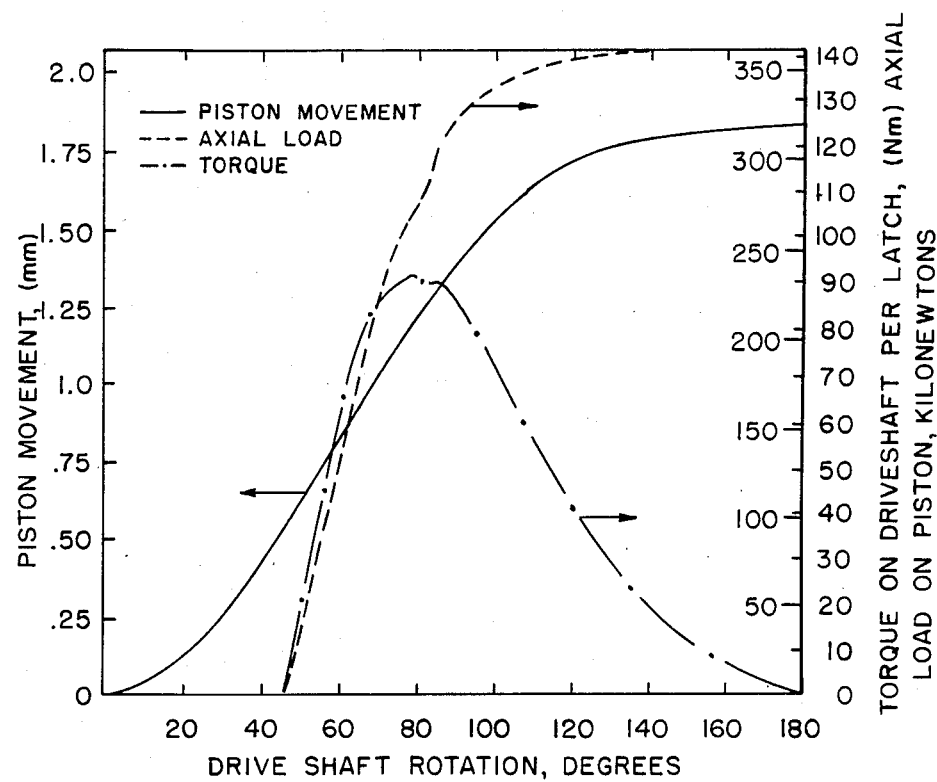
FIG. 9 shows the calculated operating characteristics of a remote controlled vacuum joint closure mechanism in accordance with the present invention.

The overall design and sizes of essential components of the remote controlled vacuum joint closure mechanism 24 were analyzed for a seal compression load of 1.4 MN/m (4,000 lb/in per seal). In order to identify the point of maximum torque on the drive shaft 76, a set of equations was developed relating piston motion to drive shaft rotation. The spring characteristics of the seals are nonlinear which imposes a nonlinear load on the piston and linkage. This load deflection was related to the geometric movement of the links in order to obtain the maximum required torque. The linkages were assumed to be horizontal at the point of maximum seal compression. The load on the linkage was described by a nonlinear curve of the combined spring characteristics of the seals. The results of these calculations are shown in the several curves presented in FIG. 9 for a selected set of parameters. The link length was chosen as 15.24 cm and the maximum stroke, $x_{max}=0.178$ cm. This configuration provides the most reasonable dimensions and resulting torques for configurations examined. The maximum torque, 234 Nm, occurred at a rotation angle of $\theta \sim 76°$. The load is 103 kN at this point, with a maximum load of 142 kN occurring when the torque equals 0. In order to account for the reduced number of pistons at the corners, the torque should be increased by the ratio 32/28, or 1.14. This provides a maximum torque of 267 Nm. This even distribution is a reasonable assumption since the flange thickness was set for a deflection of less than 0.064 cm between adjacent pistons. for different $x_{max}$'s this peak would be higher or lower depending on the position of the connecting rod and load on the linkage. Because of the loads encountered in a preferred embodiment of the present invention, preferred materials are MP-235N, Inconel 718 and Type 316SS metals. The common cam drive shafts are designed to be actuated by a special impact wrench deployed by an electromechanical manipulator. A PaR Model 6000 manipulator provides adequate force and torque to handle the 1220 Nm torque pneumatic impact wrench which is required. An additional, smaller impact wrench with a 113 Nm torque capacity can be used to release the latches. Helicoflex seals are utilized on the facing surface of the displaceable flange 18 in the present invention.

There has thus been shown a vacuum joint closure mechanism which can be remotely controlled and provides a high vacuum seal. The vacuum joint closure mechanism is applicable to large rectangular vacuum ducts such as typically encountered in advanced nuclear fusion devices. The duct size utilized in a preferred embodiment is 1 meter×0.4 meters, although it may be scaled up or down as required for other applications. Drive shaft mechanical linkages provide a large axial force against one flange which is reacted by latch mechanisms that engage a mating flange. Drive shafts are actuated by an impact or torque wrench handled by a remote manipulator in providing complete remote control of the vacuum joint closure mechanism.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A remotely controlled noncircular vacuum joint closure mechanism including first and second flanges for establishing sealed connections with respective first and second members of an evacuated system, wherein each of the first and second members includes a respective mating flange, said closure mechanism comprising:
   a tubular member having first and second end portions and a noncircular cross-section, wherein the second end portion thereof is coupled to said second flange;
   an expansion joint coupling the first end portion of said tubular member to said first flange;
   displacement means mounted on the outside of said tubular member and engaging said first flange for extending said expansion joint and displacing said first flange toward or away from the mating flange of said first member in respectively establishing or removing sealed engagement therebetween;
   latch means mounted on the outside of said tubular member for securely engaging the mating flange of said first member in maintaining sealed engagement between the mating flange of said first member and said first flange;
   first remote control means coupled to said displacement means for moving said displacement means in a first direction in displacing said first flange toward said first member or for moving said displacement means in a second direction in displacing said first flange away from said first member; and
   second remote control means coupled to said latch means for positioning said latch means in a first position for locking said first flange in sealed engagement with the mating flange of said first member or for positioning said latch means in a second position for releasing said first flange from the mating flange of said first member.

2. A closure mechanism in accordance with claim 1 wherein said tubular member and said first and second flanges are rectangular in cross-section.

3. A closure mechanism in accordance with claim 1 wherein said expansion joint includes a bellows.

4. A closure mechanism in accordance with claim 3 wherein said bellows is comprised of stainless steel.

5. A closure mechanism in accordance with claim 1 wherein said first flange includes a sealed groove on a surface thereof for engaging the mating flange of the first member of said evacuated system.

6. A closure mechanism in accordance with claim 1 wherein said latch means includes a clasp member pivotally mounted to the outside of said tubular member and rotationally displaceable between a first position and a second position for respectively engaging and releasing the mating flange of said first member.

7. A closure mechanism in accordance with claim 6 wherein said clasp member includes a first end portion for engaging the mating flange of said first member and a second end portion coupled to said second remote control means.

8. A closure mechanism in accordance with claim 7 further including means for urging said clasp member to said first position wherein the mating flange of said first member is securely engaged in a locked position.

9. A closure mechanism in accordance with claim 8 wherein said means for urging said clasp member to said first position includes a coiled spring coupled at one end to said clasp member and at its other end to the exterior of said tubular member.

10. A closure mechanism in accordance with claim 8 wherein a leading edge of the first end portion of said clasp member is chamfered for deflecting said clasp member to said second position when the first flange is positioned immediately adjacent to and in contact with the mating flange of the first member to facilitate engagement of said clasp member with the mating flange of the first member of said evacuated system when said clasp member is urged to said first position.

11. A closure mechanism in accordance with claim 7 wherein said second remote control means includes a rotating drive shaft coupled to the second end portion of said clasp member by means of a connecting rod for effecting the pivoting displacement of said clasp member.

12. A closure mechanism in accordance with claim 1 wherein said displacement means includes a longitudinally extendible piston coupled to said first flange for effecting the displacement thereof.

13. A closure mechanism in accordance with claim 12 wherein said displacement means further includes a resilient curved spring washer for urging said first flange firmly against the mating flange of said first member.

14. A closure mechanism in accordance with claim 12 wherein said displacement means further includes flexible linkage coupling said piston to said first remote control means.

15. A closure mechanism in accordance with claim 12 further including guide means mounted to said tubular member and coupled to said piston for directing the movement of said displacement means perpendicular to the plane of said first flange.

16. A closure mechanism in accordance with claim 14 wherein said first remote control means includes a rotating drive shaft and cam means coupling said rotating drive shaft to said flexible linkage for extending and retracting said piston.

17. A closure mechanism in accordance with claim 1 including a plurality of paired displacement and latch means.

18. A closure mechanism in accordance with claim 17 wherein a plurality of displacement means positioned on a common, planar surface of said tubular member are all coupled to a single first remote control means and a plurality of latch means positioned on a common, planar surface of said tubular member are all coupled to a single second remote control means.

19. A closure mechanism in accordance with claim 18 further including locking means coupled to said first remote control means for securely maintaining said plurality of displacement means in a desired position.

20. A closure mechanism in accordance with claim 19 further including alignment pins in the abutting surface of the mating flange of said first member for engaging and positioning said first flange with respect thereto.

* * * * *